United States Patent [19]

Kullendorff et al.

[11] 4,237,800
[45] Dec. 9, 1980

[54] MULTI-STAGE CLEANING PLANT

[75] Inventors: Anders Kullendorff, Aby; Jan Wikner, Finspong, both of Sweden

[73] Assignee: Stal-Laval Turbin AB, Finspong, Sweden

[21] Appl. No.: 11,591

[22] Filed: Feb. 12, 1979

[30] Foreign Application Priority Data

Feb. 13, 1978 [SE] Sweden .............................. 7801618

[51] Int. Cl.³ .......................... F23J 3/00; F23G 5/00
[52] U.S. Cl. ................................. 110/216; 110/245; 110/263; 34/57 A; 432/58
[58] Field of Search .............. 110/216, 217, 263, 245, 110/259; 432/58; 34/57 A, 57 E

[56] References Cited

U.S. PATENT DOCUMENTS

| | | | |
|---|---|---|---|
| 3,771,237 | 11/1973 | Hansen et al. | 34/57 A |
| 3,897,739 | 8/1975 | Goldbach | 110/245 |
| 4,085,707 | 4/1978 | Moss | 110/263 |
| 4,096,640 | 6/1978 | Krambrock et al. | 432/58 |

*Primary Examiner*—Henry C. Yuen
*Attorney, Agent, or Firm*—Pollock, Vande Sande & Priddy

[57] ABSTRACT

A cleaning plant positioned within an annular fluidized bed combustion chamber is divided into a plurality of separate cleaning stages, wherein a first stage is located adjacent the fluidized bed and additional stages are arranged within the first stage. Each stage comprises a plurality of separate cleaning devices which act in parallel, while cleaning devices of different stages act in series to remove debris from the combustion gases that exit from the fluidized bed combustion chamber.

11 Claims, 4 Drawing Figures

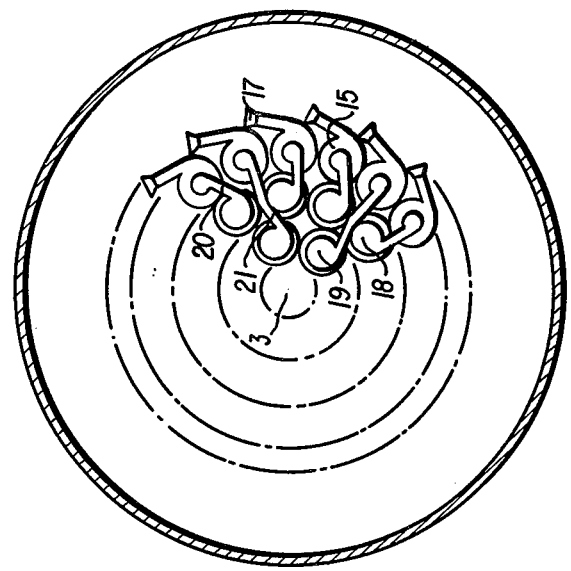
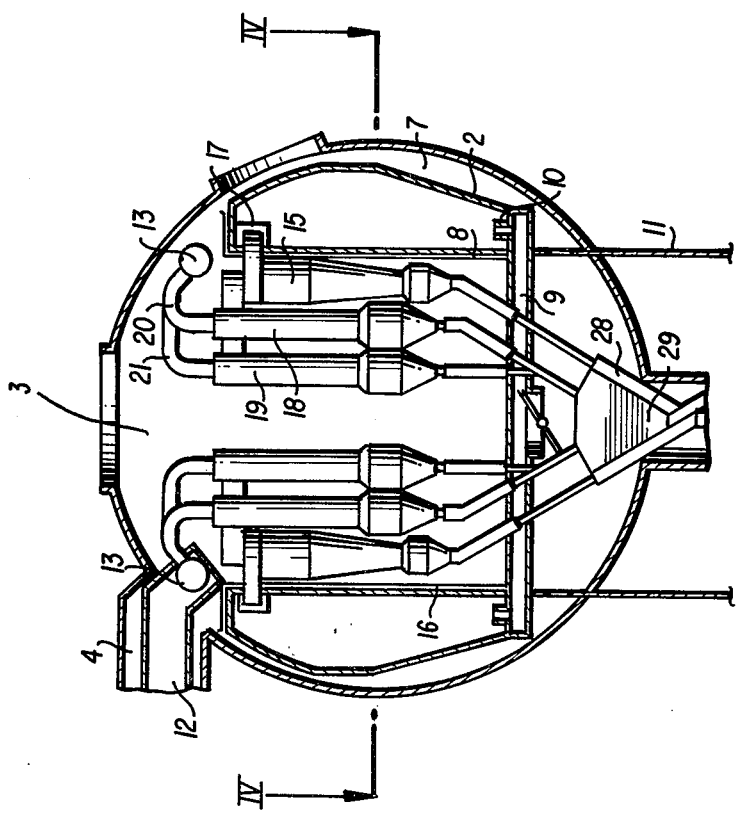
FIG. 4
FIG. 3

MULTI-STAGE CLEANING PLANT

BACKGROUND OF THE INVENTION

The present invention generally relates to a combustion chamber of the type including a substantially annularly-shaped fluidized bed positioned therein. In particular, the present invention is directd to a unique, multi-stage gas cleaning plant positionable within the annular fluidized bed for effectively cleaning the combustion gases of debris picked up during passage through the fluidized bed combustion chamber.

Fluidized bed combustion chambers are generally employed in conjunction with gas turbine assemblies and the like, wherein a compressed gas, such as air, is introduced into the fluidized bed to initiate the combustion process therein. In order to prevent damage to the turbine blades, it is essential that the heated combustion gases be cleaned or scrubbed of any debris which may have been picked up during passage through the fluidized bed. In response to this problem, prior art assemblies usually direct the combustion gases through an entirely separate cleaning plant positioned somewhere between the combustion chamber and the gas turbine assembly. Such an arrangement has proven to be both expensive in construction and cumbersome in operation, without providing any significant improvement in the actual cleaning process. Furthermore, known cleaning plants generally employ only a single cleaning stage which may not be effective in removing all of the fine ashes which may have become mixed in with the heated combustion gases. As a result, some of the ash particles may contact the turbine blades, causing damage and even premature failure to the blades.

As will be discussed in detail hereafter, applicant's new and useful invention solves the above stated problems confronting the known prior art by use of a gas cleaning plant which can be compactly mounted directly within the annular fluidized bed and which includes a plurality of uniquely constructed cleaning stages to ensure effective cleaning of the heated combustion gases prior to passage through a gas turbine assembly or the like.

OBJECTS OF THE INVENTION

An object of the present invention is to provide a multi-stage cleaning plant for effectively separating debris from heated combustion gases which have exited from a fluidized bed, prior to passage through a gas turbine assembly.

A further object of the present invention is to provide a cylindrically-shaped cleaning plant which can be arranged within a substantially annularly-shaped fluidized bed combustion chamber.

Another object of the present invention is to provide an efficiently designed, multi-stage gas cleaning plant wherein up to thirty-six separate cleaning cyclones are grouped into six sectors, each including six cyclones. A further object of the present invention is to provide a multi-stage gas cleaning plant wherein a first cleaning stage includes an outer ring of up to eighteen cyclones, with a second cleaning stage including a separate, triangularly-shaped filter box positioned inwardly of and attached to each cyclone.

These and other objects of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein:

FIG. 3 shows an axial cross-sectional view of a combustion chamber including a further cleaning plant formed in accordance with the present invention; and FIG. 4 shows a top cross-sectional view of the cleaning plant shown in FIG. 3.

DETAILED DESCRIPTION OF THE PREFERRED EMBODIMENTS

Figure 2:
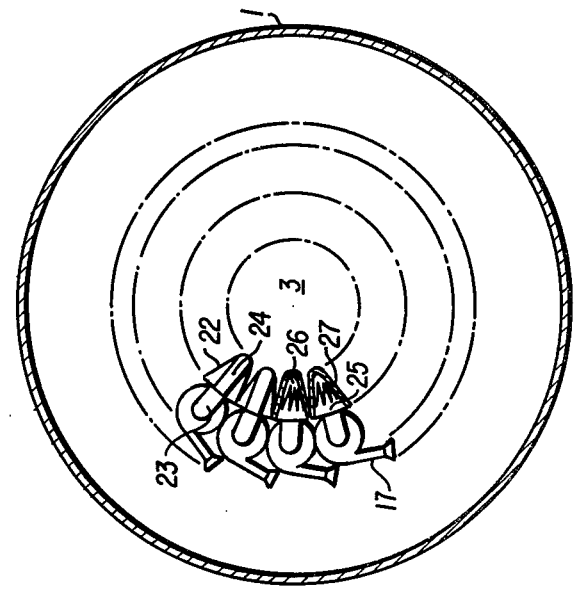
FIG. 2 shows a top cross-sectional view of the cleaning plant shown in FIG. 1.
Figure 1:
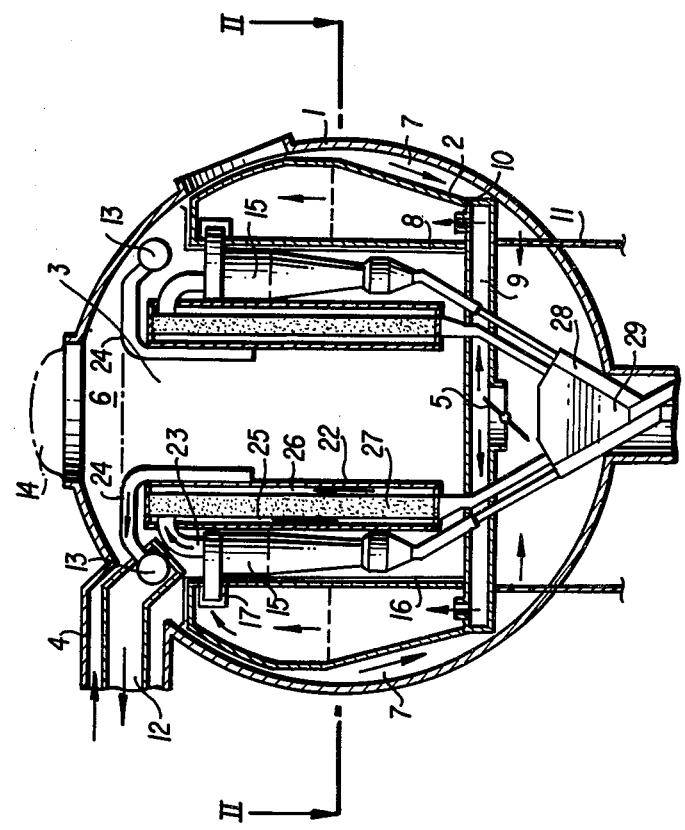
FIG. 1 shows an axial cross-sectional view of a combustion chamber including a cleaning plant formed in accordance with the present invention.

Referring to the drawings, and FIGS. 1 and 2 in particular, a combustion chamber assembly includes a substantially spherically-shaped outer casing 1 and a substantially annularly-shaped fluidized bed 2 positioned therein. A substantially cylindrically-shaped area 3 is formed by an inner wall of fluidized bed 2, with the purpose of area 3 becoming readily apparent hereafter.

Fluidized bed 2 is mounted on a double wall air distributing box 9 which extends in a horizontal plane substantially between opposite wall portions of casing 1. A valve assembly 5 is positioned in an aperture formed through a wall of box 9 facing away from fluidized bed 2. A plurality of separate nozzle apertures 10 extend through abutting surfaces of the box 9 and fluidized bed 2 to allow a compressed gas, such as air, to flow therebetween. Finally, air distributing box 9 is mounted on a base plate 11 which extends through outer casing 1 and provides a support for the entire combustion chamber as well as the outer casing inself.

The compressed gas, such as air, is introduced into the combustion chamber through an inlet 4 formed in a generally upper portion of outer casing 1. The compressed air flows from inlet 4 into an upper space 6 defined between the casing 1 and fluidized bed 2. A portion of the compressed air then flows through a narrow cooling gap 7 formed by confronting wall surfaces of annular fluidized bed 2 and spherical casing 1, with the compressed air entering air distributing box 9 through valve 5. A further portion of the compressed air flows through a narrow cooling gap 8 formed between fluidized bed 2 and cylindrical area 3 and enters box 9 through additional apertures formed therein. From box 9, the compressed air flows through the plurality of nozzles 10 into fluidized bed 2 where it reacts with fuel introduced into bed 2 in a conventional manner. Combustion gases produced as a result of the mixture of fuel and compressed air flow through an exit aperture located in a top portion of fluidized bed 2 and enter a cleaning plant positioned within cylindrically-shaped area 3. Finally, the cleaned and heated combustion gases are collected in a ring conduit 13 and are discharged from casing 1 via an outlet conduit 12 which may extend coaxially within inlet 4. It is noted that both spaces 6 and 3 are accessible via a lid 14 which surrounds an aperture formed through a vertically upper portion of spherical casing 1.

Referring again to FIGS. 1 and 2, a detailed explanation of the unique cleaning plant positioned within cylindrical space 3 follows hereafter. The cleaning plant comprises a two-stage assembly, with the first stage including a plurality of separate cleaning cyclones 15 forming a substantially ring-shaped assembly positioned adjacent to an inside wall of a cylindrical casing 16 which defines an outer boundary of space 3 as well as an inner boundary of gap 8. Each cyclone 15 includes an intake conduit 17 which engages an outlet aperture located at an upper portion of the fluidized bed 2, that is, above the fluidized bed itself. Cyclones 15 act in parallel as coarse filters to remove debris, ash and the like from the combustion gases which exit from the fluidized bed 2.

As shown in FIGS. 1 and 2, the second stage of the cleaning plant consists of a plurality of fibre filter boxes, with each box having an inlet attached to an outlet of a respective cyclone 15. The filter boxes are also arranged in a ring which is positioned adjacent to and within the ring formed by cyclones 15. In a preferred arrangement, eighteen separate cyclones 15 and a corresponding eighteen separate filter boxes may be positioned within casing wall 16. At their upper end, each of the filter boxes includes an inlet conduit 23 which is attached to an outlet of a respective cyclone 15. Each filter box also includes an outlet conduit 24 which is attached to ring conduit 13 that extends about an inner wall portion of a casing 1. Each filter box further includes a pair of longitudinally extending air distribution chambers 25 and 26, respectively, with a filter mat or compound 27 positioned therebetween. Chambers 25 and 26 as well as compound 27 each extends substantially the entire length of the filter box which tends to force the combustion gases to flow substantially the length of each chamber 25 and 26. Furthermore, the triangular cross-section of each box acts to control air speed through the filter box, allowing the dirt to be taken up due to the compressed gases flowing at relatively low speeds in chamber 25, while the clean combustion gases flow through the outer chamber 26 at relatively higher speeds.

During operation, heated combustion gases enter each cyclone 15 via inlet 17, wherein a portion of the dirt and debris is separated from the combustion gases. The gases then leave each cyclone 15 through conduits 23 and enter a chamber 25 of its respective filter box. As the combustion gases flow through each chamber 25, filter compound 27 and chamber 26, fine debris is separated from the combustion gases. Finally, the clean gases exit the filter box via conduit 24 and enter ring conduit 13. From ring conduit 13, the gases enter outlet conduit 12 which leads from casing 1 to the gas turbine. Debris collected in cyclones 15 is removed via funnel assembly 28, while fine debris collected within each of the filter boxes is removed via a separate funnel assembly 29. In this way the separated debris materials may be later assorted and treated with regard to their respective coarseness.

Turning to FIGS. 3 and 4, a further embodiment of the present invention is shown, wherein the filter boxes have been replaced by an additional plurality of filter cyclones 18 and 19, similar in structure to cyclones 15. Cyclones 18 and 19 are arranged in two rings and connected in series with a corresponding cyclone 15 via conduits 20 and 21, respectively. In a preferred arrangement, an outer ring of eighteen cyclones 15 may surround an intermediate ring of twelve cyclones 18 and an inner ring of six cyclones 19, respectively. In this way, the cyclones can be divided into six sectors each comprising six cyclones, to efficiently fill the space formed within fluidized bed 2. The cyclones 18 and 19 function in a manner similar to the filter boxes discussed with regard to FIGS. 1 and 2; in that, cyclones 18 and 19 act to separate relatively fine debris from the heated combustion gases which flow from the cyclones 15.

By dividing the cleaning plant into multiple stages of parallel and series connected cleaning units, return blowing of one or a few units, as may be required, can be easily conducted without stopping the operation of the entire cleaning plant. Furthermore, while eighteen first stage cyclones 15 have been shown in each embodiment, it is considered within the scope of the present invention to arrange any number of filter cyclones and/or filter boxes within the cylindrical casing 16.

The present invention is not to be limited to the above-described embodiments, but is to be limited only by the scope of the following claims.

We claim:

1. A combination of a hollow fluizided combustion chamber and cleaning plant assembly, comprising:
    said hollow fluidized bed combustion chamber mounted within a hollow outer casing, said hollow fluidized bed combustion chamber having a substantially cylindrically-shaped inner wall defining a substantially cylindrically-shaped area extending through said hollow fluidized bed combustion chamber;
    said cleaning plant positioned within said substantially cylindrically-shaped area and surrounded by said hollow fluidized bed combustion chamber, said cleaning plant including a plurality of first stage cleaning means having inlets in direct fluid communication an outlet of with said hollow fluidized bed combustion chamber for receiving hot combustion gases from said fluidized bed and cleaning debris from said hot gases during passage through said cleaning plant prior to said hot gases exiting said surrounding outer casing.

2. A cleaning plant according to claim 1, wherein a further plurality of cleaning means are positioned radially inwardly of said first stage cleaning means for separating fine debris from hot combustion gases flowing therethrough;
    and connection means extend between outlets of said plurality of first stage cleaning means and inlets of said further cleaning means.

3. A cleaning plant according to claim 1, wherein said plurality of first stage cleaning means comprises a plurality of similarly-shaped cyclone filter members each positioned adjacent to the cylindrically-shaped inner wall of said hollow fluidized bed combustion chamber.

4. A cleaning plant according to claim 3, wherein a separate conduit extends between an inlet of each cyclone member and an outlet portion of said cylindrically-shaped fluidized bed combustion chamber.

5. A cleaning plant according to claim 2, wherein said further plurality of cleaning means comprises a plurality of additional cyclone filter members, with each additional cyclone having an inlet attached to an outlet of a respective first stage cleaning means via said further connection means.

6. A cleaning plant according to claim 2, wherein said further plurality of cleaning means comprises a plurality of similarly-shaped fiber filter boxes radially surrounded by said first stage cleaning means and attached thereto via said further connection means.

7. A cleaning plant according to claim 6, wherein each of said fiber filter boxes includes longitudinally extending inlet and outlet chambers with a fiber compound positioned therebetween;

with each of said inlet chambers being attached to said further connection means and each of said outlet chambers being connected to a flow passage leading to a gas turbine and the like.

8. A cleaning plant according to claim 6, wherein each of said filter boxes has a substantially triangular cross-sectional configuration.

9. A cleaning plant according to claim 2, wherein separate discharging means are attached to both said first stage cleaning means and said further cleaning means for removing debris separated from the hot combustion gases flowing therethrough.

10. A cleaning plant according to claim 3, wherein eighteen cyclone filter members are positioned adjacent to said cylindrically-shaped inner wall of said hollow fluidized bed combustion chamber.

11. A cleaning plant according to claim 5, wherein eighteen additional cyclones are arranged in two rings within said cleaning means, wherein a radially outer ring includes twelve cyclones and a radially inner ring includes six cyclones.

* * * * *